Figure 1:
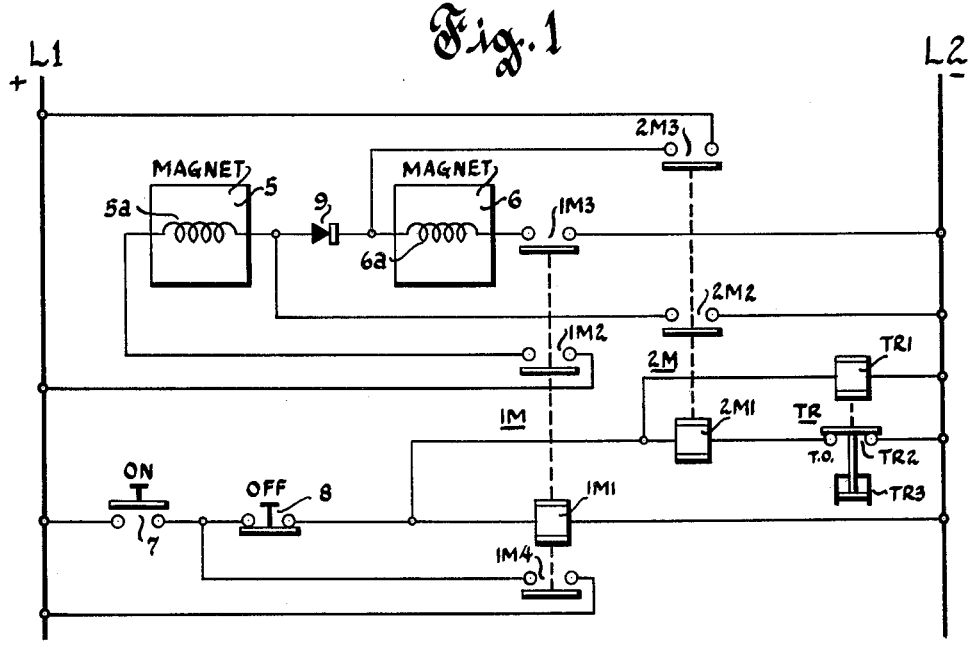

July 10, 1962   A. E. LILLQUIST   3,043,990
ENERGIZING CONTROL SYSTEM FOR A PLURALITY OF ELECTROMAGNETS
Filed Sept. 23, 1958

Inventor
Arvid E. Lillquist
By H R Rather
Attorney

3,043,990
Patented July 10, 1962

3,043,990
ENERGIZING CONTROL SYSTEM FOR A PLURALITY OF ELECTROMAGNETS
Arvid E. Lillquist, Wauwatosa, Wis., assignor to Cutler-Hammer, Inc., Milwaukee, Wis., a corporation of Delaware
Filed Sept. 23, 1958, Ser. No. 762,772
7 Claims. (Cl. 317—123)

This invention relates to an energizing control system for a plurality of electromagnets.

In certain applications it is desired to energize two or more electromagnets quickly and with high force by connecting their energizing windings across an electrical supply source in parallel. Following this initial quick energization these energizing windings must be reconnected in series across the source to prevent prolonged overenergization and attendant overheating. This series reconnection of the windings poses the problem of momentary short circuiting, and momentary deenergization which can not be tolerated in applications where rotating parts must be maintained in the relative rotational relation fixed by the initial energization of the electromagnets.

It is therefore an object of the present invention to provide improved energizing control systems for a plurality of electromagnets affording initial connection to an electrical supply source in parallel, and reconnection of the same in series across such supply source after a predetermined interval while insuring against short circuiting and loss of energization in the transition.

Other objects and advantages of the invention will hereinafter appear.

The accompanying drawings illustrate preferred embodiments of the invention which will now be described in detail, it being understood that the embodiments illustrated are susceptible of modifications in respect of details without departing from the scope of the appended claims.

Figure 2:
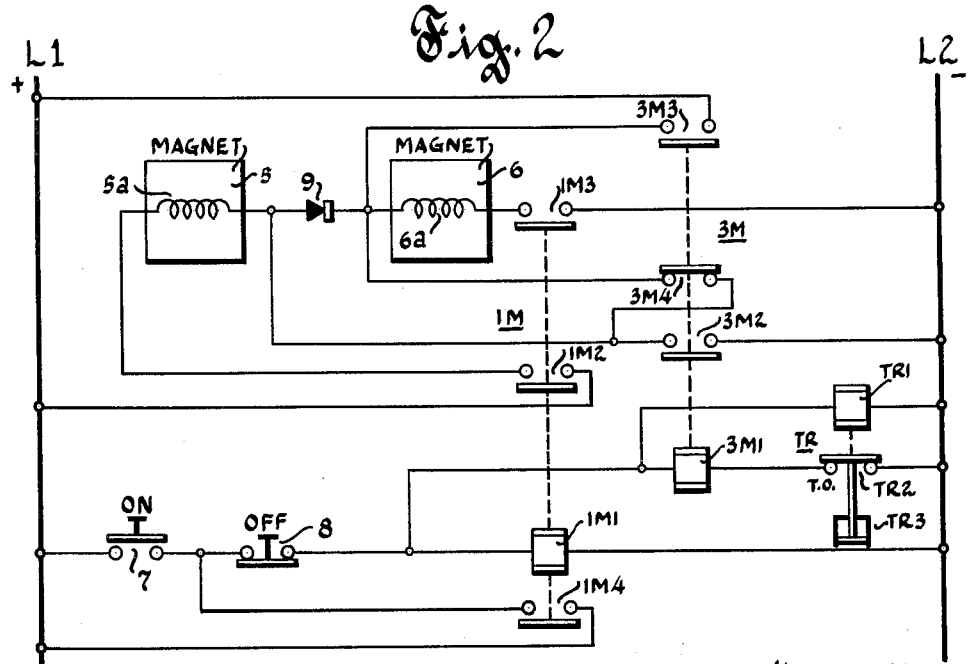

In the drawings:

FIGURE 1 is a diagrammatic showing of a plurality of electromagnets and a control system therefor constructed in accordance with the invention, and FIG. 2 is similar to FIG. 1, but shows a modified form of control system.

Referring to FIG. 1, it shows a pair of electromagnets 5 and 6 having energizing windings 5a and 6a, respectively. Winding 5a is connectable across supply lines L1 and L2 of a source of D.C. supply voltage through closure of normally open contacts 1M2 of an electroresponsive contactor 1M and closure of normally open contacts 2M2 of a second electroresponsive contactor 2M. Winding 6a is connectable across supply lines L1 and L2 in parallel with winding 5a by closure of normally open contacts 1M3 of contactor 1M and normally open contacts 2M3 of contactor 2M. An energizing circuit is completable for control winding 1M1 of contactor 1M by closure of a momentary type "On" switch 7. Closure of switch 7 completes a circuit from line L1 through switch 7, a normally closed "Off" switch 8, winding 1M1 to line L2. Closure of switch 7 also completes a parallel energizing circuit for winding 2M1 of contactor 2M from the common point between switch 8 and winding 1M1 through winding 2M1 and normally closed contacts TR2 of a timing relay TR to line L2. Timing relay TR has a control winding TR1 and a time delay element TR3 affording time delay opening of contacts upon energization of winding TR1. Winding TR1 is connected in parallel with windings 1M1 and 2M1 to line L2 so it will be energized simultaneously therewith. Contactor 1M is provided with a third set of normally open contacts 1M4 which close upon energization of winding 1M1 to provide a well known maintaining circuit for windings 1M1, 2M1 and TR1 upon release of "On" switch 7.

A blocking rectifier 9 is connected in series between adjacent ends of windings 5a and 6a of the electromagnets 5 and 6. It will be noted that the high potential or positive terminal of rectifier 9 is connected to the point common between winding 5a and the left-hand contact of contact 2M2 and the low potential or negative terminal of this rectifier is connected to the point common between winding 6a and the left hand contact of contacts 2M3. As will hereinafter be more fully explained rectifier 9 connected as shown prevents short circuiting when windings 5a and 6a are initially connected in parallel and affords instantaneous series connection of the latter widings upon dropout of the parallel connection thereby preventing interruption of energization of either of such windings.

Let it be assumed that lines L1 and L2 are energized and that switch 7 is closed. Closure of switch 7 as aforementioned results in energization of windings 1M1 and 2M1 of contactors 1M and 2M and winding TR1 of timing relay TR. Thus winding 5a of electromagnet 5 will be energized across lines L1 and L2 through the then closed contacts 1M2 and 2M2, and winding 6a will be energized in parallel therewith through the then closed contacts 2M3 and 1M3. Rectifier 9 as connected prevents a short circuit between these parallel connections at this part of the cycle. At a predetermined interval following energization of winding TR1, contacts TR2 of timing relay TR in response to action of time delay device TR3 open to deenergize winding 2M1 of contactor 2M, thereby causing contacts 2M2 and 2M3 to open. The opening of contacts 2M2 and 2M3 interrupts the parallel energizing circuits for windings 5a and 6a, and during the transition windings 5a and 6a are instantaneously connected in series through rectifier 9 and the then closed contacts 1M2 and 1M3 of contactor 1M. Thus there is continuity of energization for both of the windings 5a and 6a during the change from initial parallel energization to the continuous series energization of the same.

When it is desired to deenergize windings 5a and 6a it is merely necessary to momentarily open "Off" switch 8 which interrupts the energizing connections for winding 1M1 of contactor 1M. Deenergization of contactor 1M results in opening of its contacts 1M2, 1M3 and 1M4 thereby interrupting the energizing connections for windings 5a and 6a of electromagnets 5 and 6, and windings 2M1 of contactor 2M and winding TR1 of relay TR.

The modified form of FIG. 2 is very similar to that of FIG. 1 and corresponding elements bear like reference numerals. The modified form differs in utilizing an electroresponsive contactor 3M in place of contactor 2M of FIG. 1, and an additional circuit connection. Contactor 3M is like the aforementioned contactor 2M of FIG. 1 but additionally has a set of normally closed contacts 3M4. The left-hand contact of contacts 3M4 is connected to the point common to the low potential or negative terminal of rectifier 9, winding 6a and the left-hand terminal of contacts 3M3, and the right-hand contact of contacts 3M4 are connected to the point common to winding 5a, the high potential or positive terminal of rectifier 9, and the left-hand contact of contacts 3M2. Preferably, contactor 3M should be constructed so that upon energization of winding 3M1 contacts 3M4 open before either of the contacts 3M2 and 3M3 close, and upon deenergization contacts 3M2 and 3M3 open in advance of reclosure of contacts 3M4.

The control system of FIG. 2 functions similarly to that of FIG. 1, but the addition of contacts 3M4 and the aforedescribed additional connections affords bypass of the rectifier 9 following completion of the series energizing connections for windings 5a and 6a. Rectifier 9 affords the same short-circuit protection when windings 5a and 6a are connected for parallel energization and continuity in the transition from the parallel to series connection thereof, but is bypassed as soon as contacts 3M4 reclose. This bypassing of rectifier 9 cuts down on the power loss that might otherwise occur in rectifier 9 during continuous series energization of windings 5a and 6a, and also permits use of a rectifier of lower rating.

I claim:

1. The combination with a plurality of electromagnetic devices each of which has an energizing winding, of electroresponsive means energizable to connect the energizing windings of at least two of said devices across a source of D.C. voltage in parallel circuits, electroresponsive time delay means acting a predetermined interval following energization thereof to cause said electroresponsive means to interrupt said parallel circuits and reconnect said energizing windings of said two devices in series across the D.C. source, means for simultaneously energizing said electroresponsive means and said electroresponsive time delay means, and a unidirectional conducting device connected in series with said windings of said two devices to prevent short circuit between said parallel circuits and provide circuit continuity between said windings of said two devices in the transition to series connection thereof across the D.C. source.

2. The combination according to claim 1 wherein said electroresponsive means comprises two electromagnetic contactors one of which is deenergized in response to the aforementioned action of said electroresponsive time delay means to interrupt said parallel circuits and reconnect said windings of said two devices in series across the D.C. source.

3. The combination according to claim 1 wherein said unidirectional conducting device is a rectifier.

4. The combination according to claim 1 wherein said electroresponsive means in responding to interrupt said parallel circuits and reconnect said energizing windings of said two devices in series across said D.C. source additionally establishes a shunt circuit around said unidirectional conducting device when the series connection of said windings of said two devices across the D.C. source is completed.

5. The combination according to claim 2 wherein said one of said electromagnetic contactors has normally closed contacts which upon deenergization of that contactor reclose to establish a shunt circuit around said unidirectional conducting device when the series connection of said windings of said two devices across the D.C. source is completed.

6. The combination with a pair of electromagnetic devices each of which has an energizing winding and a source of D.C. voltage, of two electromagnetic contactors simultaneously energizable to connect the windings of said devices in parallel circuits across said source, an electromagnetic time delay relay which acts a predetermined interval following energization thereof to deenergize one of said contactors to effect interruption of one of said parallel circuits and reconnection of said windings of said devices in series across said source, means operable to simultaneously energize said contactors and said relay, and a blocking rectifier permanently connected between and in series with said windings of said two devices to prevent short circuit between said parallel circuits and provide continuity of energization of said windings in the transition to series connection thereof across said source.

7. The combination according to claim 6 wherein said one of said contactors upon deenergization additionally completes a shunt circuit around said rectifier thereby rendering the latter ineffective following completion of the series connection of said windings across said source.

References Cited in the file of this patent

UNITED STATES PATENTS

| | | |
|---|---|---|
| 983,905 | Johnson | Feb. 14, 1911 |
| 1,001,710 | Thomson | Aug. 29, 1911 |
| 2,131,942 | Evans | Oct. 4, 1938 |
| 2,344,178 | Sparrow | Mar. 14, 1944 |